United States Patent
Yli-Vakkuri

(10) Patent No.: US 7,389,655 B2
(45) Date of Patent: Jun. 24, 2008

(54) APPARATUS FOR BENDING AND TEMPERING GLASS PANELS

(75) Inventor: Erkki Yli-Vakkuri, Marin-Epagnier (CH)

(73) Assignee: Tamglass Ltd. Oy, Tampere (FI)

( * ) Notice: Subject to any disclaimer, the term of this patent is extended or adjusted under 35 U.S.C. 154(b) by 483 days.

(21) Appl. No.: 10/458,524

(22) Filed: Jun. 11, 2003

(65) Prior Publication Data

US 2003/0230116 A1    Dec. 18, 2003

(30) Foreign Application Priority Data

Jun. 12, 2002    (FI) .................................. 20021131

(51) Int. Cl.
*C03B 23/027*    (2006.01)
(52) U.S. Cl. ............................... 65/287; 65/290; 65/291
(58) Field of Classification Search .................. 65/273, 65/287, 290, 291, 349, 351
See application file for complete search history.

(56) References Cited

U.S. PATENT DOCUMENTS

| | | | | |
|---|---|---|---|---|
| 2,570,309 A | * | 10/1951 | Black ........................... | 65/107 |
| 4,529,433 A | * | 7/1985 | Bennett et al. ................ | 65/273 |
| 4,909,820 A | * | 3/1990 | Hirotsu et al. ................ | 65/106 |
| 4,986,842 A | | 1/1991 | Peltonen | |
| 5,147,440 A | | 9/1992 | Leponen et al. | |
| 5,306,324 A | | 4/1994 | Vehmas et al. | |
| 5,364,436 A | | 11/1994 | Montonen | |
| 5,472,469 A | * | 12/1995 | Yli-Vakkuri et al. .......... | 65/107 |
| 5,695,537 A | | 12/1997 | Sykes | |
| 5,858,047 A | * | 1/1999 | Frank et al. .................... | 65/104 |
| 5,902,367 A | * | 5/1999 | Salonen ....................... | 65/29.1 |
| 6,983,624 B2 | * | 1/2006 | Yli-Vakkuri ................. | 65/274 |

FOREIGN PATENT DOCUMENTS

| | | |
|---|---|---|
| EP | 0 338 216 A2 | 10/1989 |
| EP | 0 354 001 A1 | 2/1990 |
| EP | 0 592 862 A1 | 4/1994 |
| EP | 0 624 244 B1 | 11/1994 |
| FI | C 87920 | 11/1992 |

OTHER PUBLICATIONS

Finnish Search Report, date unknown.

* cited by examiner

*Primary Examiner*—Carlos Lopez
(74) *Attorney, Agent, or Firm*—Buchanan Ingersoll & Rooney PC

(57) ABSTRACT

An apparatus for bending and tempering glass panels includes a number of ring moulds for supporting and conveying glass panels; a number of preheating sections for heating glass panels to a bending temperature; at least one prebending section for sagging a glass panel gravitationally; a bending section provided with a hoistable and descendable press mould; and a quenching section for tempering a bent glass panel. The bending section is provided with a hoistable and descendable mould supporting frame for supporting the mould from below during a press-bending operation. The supporting frame is mounted on a mobile cassette wagon which constitutes a replaceable floor for the bending section.

8 Claims, 2 Drawing Sheets

APPARATUS FOR BENDING AND TEMPERING GLASS PANELS

The invention relates to an apparatus for bending and tempering glass panels, said apparatus comprising
a number of ring moulds for supporting and conveying glass panels;
a number of preheating sections for heating glass panels to a bending temperature;
at least one prebending section for sagging a glass panel gravitationally;
a bending section provided with a hoistable and descendable press mould; and
an annealing section for tempering a bent glass panel.

Similar types of equipment without a press mould are known from patent publications U.S. Pat. No. 5,306,324 and EP-624244. However, these devices do not possess a capability of bending complex forms presently appearing e.g. in the double-curvature rear windows of automobiles. On the other hand, e.g. the patent publication U.S. Pat. No. 5,695,537 discloses a press-bending apparatus, wherein a glass element, having been bent gravitationally on a ring mould, is subjected to final bending by means of a press mould. In order to make a gable-hinged mould sufficiently rigid for a press-bending operation, the mould will become relatively massive and structurally heavy. The heating and recooling of such moulds requires more heating and cooling effect or reduces production capacity of the apparatus.

It is an object of the invention to provide the above type of a bending and tempering apparatus for complex forms, which enables the use of a light-structured mould fit for gravitational bending or a hinge mould and a light-structured frame-like mould carrier also during a press-bending operation.

According to the invention, this object is achieved in such a way that the bending section is provided with a hoistable and descendable mould supporting frame for supporting the mould from below during a press-bending operation.

Such a supporting frame is preferably included in a mobile cassette wagon, which constitutes a replaceable floor for the bending section.

Figure 1:
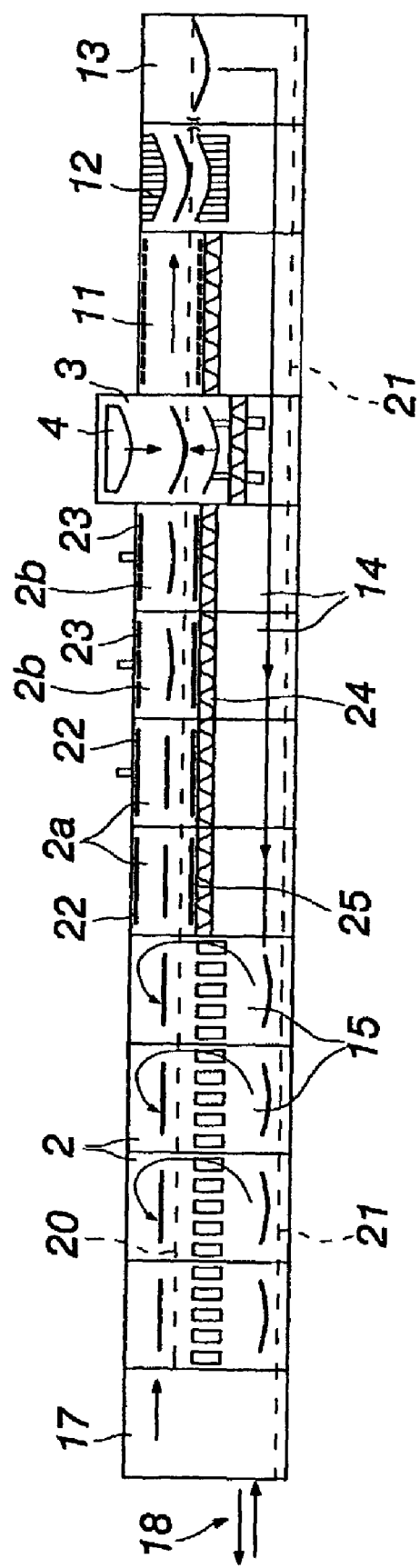
Figure 2:
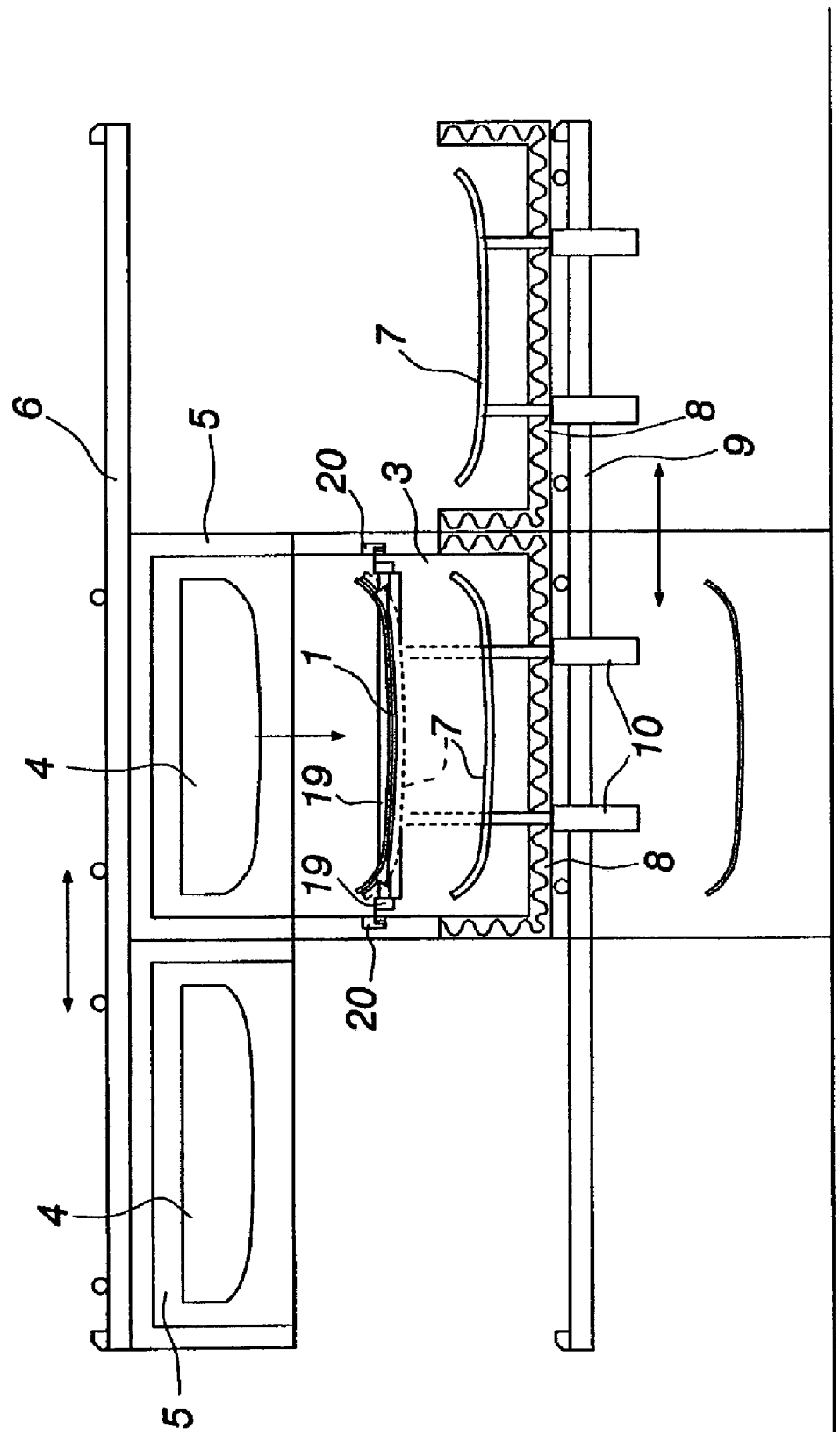

One exemplary embodiment of the invention will now be described in more detail with reference to the accompanying drawings, in which FIG. 1 shows an apparatus of the invention in a schematic vertical section, and FIG. 2 shows a cross-section through the press-bending section of the apparatus of FIG. 1.

An unloading and loading section 18 is used for removing of bent and tempered glass panels from a ring mould 1 (FIG. 2) and for placing a glass panel to be bent on the ring mould which is conveyed into an elevator section 17 for lifting the mould onto an upper conveyor track 20. FIG. 2 illustrates how the mould 1 is supported on a ring-like carrier 19, such that the mould 1 and the carrier 19 are essentially flush with each other and flanges present along the sides of the carrier 19 extend into grooves present in the furnace walls onto rollers of the conveyor track 20. A number of successive mould carriers 19, along with moulds 1 and glass panels to be bent, are adapted to be intermittently conveyable towards a bending section 3, having its ceiling provided with a hoistable and descendable male mould 4. A lower track 21 of mould carriers includes respectively successive mould carriers 19, along with moulds 1 and tempered glass panels. The mould carriers 19 of the lower track 21 are also adapted to be intermittently conveyable in a direction opposite to the conveying direction of the mould carriers present on the upper track of mould carriers.

First in the passage of the upper track 20 are preheating sections 2, in which the heating is based on forced convection which takes up its thermal energy from glass panels presently cooling by means of forced convection in lower cooling sections 15. Thus, the cooling of glass panels can be sped up in the cooling sections 15 and the heating of glass panels to be heated can be sped up in the heating sections 2. At the same time, this enables a more effective exploitation of thermal energy present in glass panels to be cooled. The sections 2 and 15 can be structurally and functionally essentially as described in the Applicant's patent publication U.S. Pat. No. 4,986,842.

From the sections 2, the carriers 19, along with moulds 1 thereon, proceed into preheating sections 2a for effecting the principal heating of glass panels by radiation heating. Therefore, the sections 2a have their ceilings provided with electrically heated radiation heating resistances 22.

Next are prebending sections 2b, in which the temperature of a glass panel rises to such a degree that the glass panel begins to sag upon the ring mould 1 supporting the same. The number of prebending sections 2b is sufficient for reaching almost a final bending shape by gravitational bending in the final prebending section 2b. Thus, the male mould 4 present in the section 3 is only used for finishing the bending action to maintain a high optical quality. Resistances 23 present on the ceiling of the prebending sections 2b are also divided in a lengthwise direction of the furnace (in the conveying direction) for resistance sub-fields for providing a heat application pattern consistent with a desired bending form.

The sections 2a and 2b have a thermally insulated bottom 24, which constitutes a floor between the upper track sections 2a, 2b and lower track sections 14. On top of this floor 24 lie radiation heating elements 25 set below the level of the carriers 19 and the mould 1 and heating the bottom of a glass panel presently within the sections 2a and 2b with direct radiation heat.

Since the carrier 19 is nothing more than a light-structured ring, and since the mould 1 is also a light-structured ring mould which is supported with its outward protruding brackets upon inward protruding brackets of the carrier 19, the mould 1 and the carrier 19 do not constitute a sufficiently robust assembly for press-bending performed by the mould 4. This problem is solved in the invention in such a way that the bending section 3 is provided with a hoistable and descendable mould supporting frame 7 capable of supporting the mould 1 from below during a press-bending operation. The supporting frame 7 comprises a circular ring complementary to the shape of the ring mould's 1 bottom surface. If necessary, the supporting frame 7 can be provided with positioning means for finalizing and precising the mould's 1 position within the bending section 3. If the ring mould comprises a so-called hinge mould provided with hinges at its ends, the supporting frame 7 has a shape which is complementary to the hinge mould's ultimate bending shape. The supporting engagement between the supporting frame 7 and the ring mould 1 need not be continuous as long as there are a sufficient number of supporting points around the ring.

The supporting frame 7 is carried by a mobile cassette wagon 8 which constitutes a replaceable floor for the bending section 3. Thus, when switching a bending shape, it is possible to provide the bending section 3 with a supporting frame 7 matching the contour of a mould. The supporting frame 7 is propped on the cassette wagon 8 by means of hoisting cylinders 10. Two adjacent cassette wagons 8 are mounted on a rail 9, which lies transversely to the conveying direction of the moulds 1 and which extends beyond the bending section 3 on either side, either one of the cassette wagons 8 being movable to establish the floor for the bending section 3.

The bending section 3 has a replaceable ceiling 5 which accommodates the press mould 4. Two adjacent ceilings 5, along with their press moulds 4, are mounted on a rail 6, which lies transversely to the conveying direction of the moulds 1 and which extends beyond the bending section 3 on either side, either one of the ceilings 5, along with their press moulds 4, being movable to establish the ceiling for the bending section 3.

The bending operation is followed by conveying a bent glass panel on the mould 1 and the mould carrier 19 through a rapid heating section 11 into a quenching section 12, which includes top and bottom cooling air boxes provided with nozzles for blasting jet of quenching air to both surfaces of the glass panel. The tempered glass panel is transferred in a lift section 13 onto the lower track 21, along which it is carried in a single long rapid nonstop passage under the sections 11, 3, 2b and 2a into the previously described cooling sections 15. Upon arrival in the first cooling section 15, the glass panel temperature is e.g. 440°, which enables the transfer of a considerable amount of heat between the sections 15 and 2 by means of forced convection. However, the recovery of heat for heating the upper track glass panels is not absolutely necessary, but, instead, the upper track sections 2 can all be provided with radiation heaters 22 and the last lower track sections 15 can be provided with forced-convection based cooling, the thermal energy obtained therefrom being useful e.g. for heating a building.

The invention claimed is:

1. An apparatus for bending and tempering glass panels, said apparatus comprising
   a number of ring moulds for supporting and conveying glass panels;
   a number of successive mold carriers for supporting and conveying the ring moulds;
   a number of preheating sections for heating glass panels to a bending temperature;
   at least one prebending section for sagging a glass panel gravitationally;
   a bending section provided with a hoistable and descendable press mould; and
   a quenching section for tempering a bent glass panel,
   wherein the bending section is provided with a hoistable and descendable mould supporting frame for directly supporting the ring mould from below during a press-bending operation, and
   wherein said apparatus further comprises a rapid heating section between the bending section and the quenching section for rapidly heating the bent glass panel.

2. An apparatus as set forth in claim 1, wherein the supporting frame is mounted on a mobile cassette wagon which constitutes a replaceable floor for the bending section.

3. An apparatus as set forth in claim 2, wherein the supporting frame is propped on the cassette wagon by means of hoisting cylinders.

4. An apparatus as set forth in claim 2, wherein two adjacent cassette wagons are mounted on a rail, which lies transversely to the conveying direction of the ring moulds and which extends beyond the bending section on either side, either one of the cassette wagons being movable to establish the floor for the bending section.

5. An apparatus as set forth in claim 1, wherein the bending section has a replaceable ceiling which accommodates the press mould, and wherein two adjacent ceilings, along with their press moulds, are mounted on a rail, which lies transversely to the conveying direction of the moulds and which extends beyond the bending section on either side, either one of the ceilings, along with their press moulds, being movable to establish the ceiling for the bending section.

6. An apparatus as set forth in claim 1, wherein the mould comprises a hinge mould.

7. An apparatus for bending and tempering glass panels, said apparatus comprising:
   a number of ring moulds for supporting and conveying glass panels;
   a number of preheating sections for heating glass panels to a bending temperature;
   at least one prebending section for sagging a glass panel gravitationally;
   a bending section provided with a hoistable and descendable press mould; and
   a quenching section for tempering a bent glass panel;
   wherein the bending section is provided with a hoistable and descendable mould supporting frame for supporting the ring mould from below during a press-bending operation;
   wherein the supporting frame is mounted on a mobile cassette wagon which constitutes a replaceable floor for the bending section; and
   wherein two adjacent cassette wagons are mounted on a rail, which lies transversely to the conveying direction of the moulds and which extends beyond the bending section on either side, either one of the cassette wagons being movable to establish the floor for the bending section.

8. An apparatus for bending and tempering glass panels, said apparatus comprising:
   a number of ring moulds for supporting and conveying glass panels;
   a number of preheating sections for heating glass panels to a bending temperature;
   at least one prebending section for sagging a glass panel gravitationally;
   a bending section provided with a hoistable and descendable press mould; and
   a quenching section for tempering a bent glass panel;
   wherein the bending section is provided with a hoistable and descendable mould supporting frame for supporting the ring mould from below during a press-bending operation;
   wherein the bending section has a replaceable ceiling which accommodates the press mould; and
   wherein two adjacent ceilings, along with their press moulds, are mounted on a rail, which lies transversely to the conveying direction of the moulds and which extends beyond the bending section on either side, either one of the ceilings, along with their press moulds, being movable to establish the ceiling for the bending section.

* * * * *